United States Patent Office 2,792,015
Patented May 14, 1957

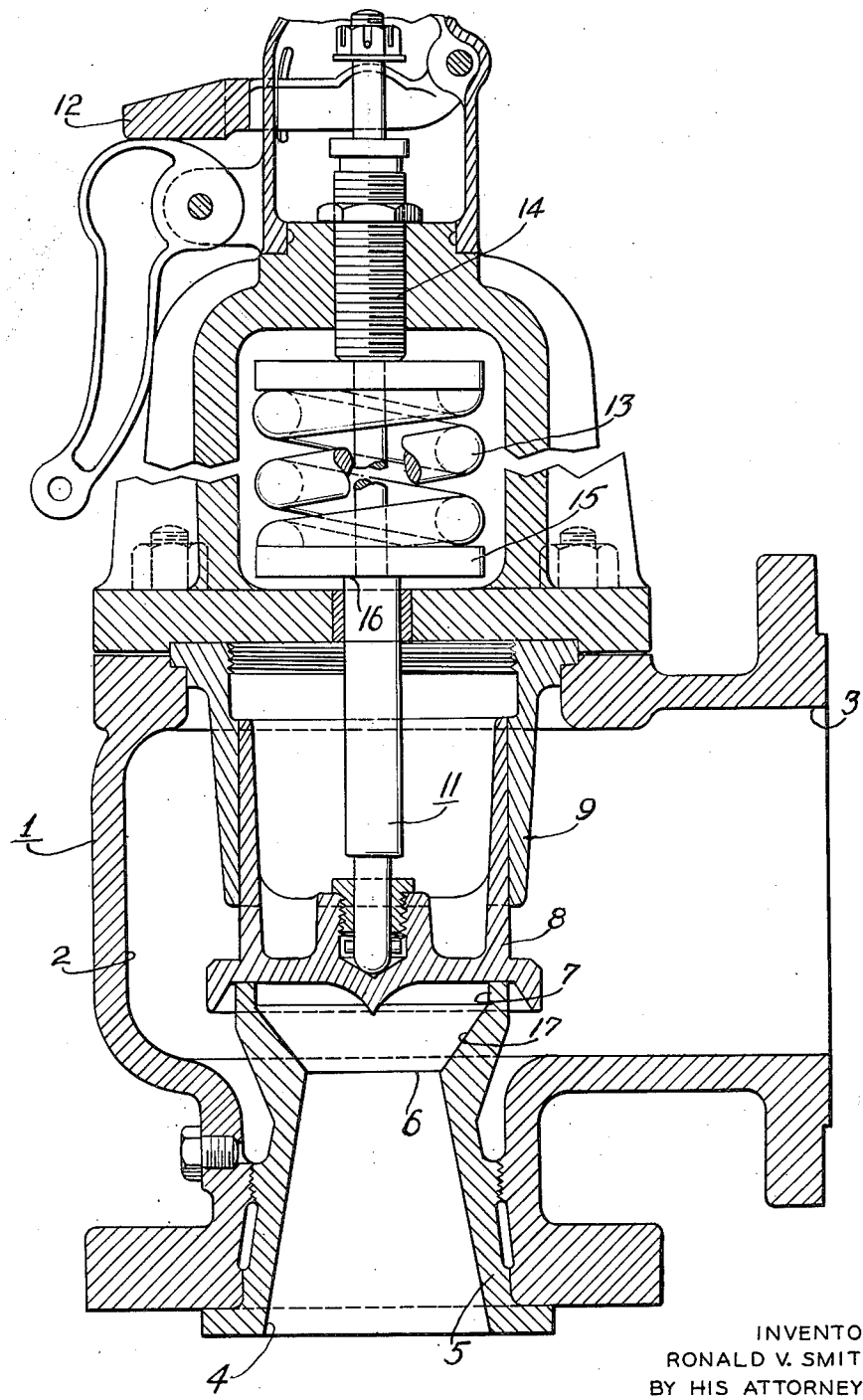

2,792,015

LIQUID RELIEF VALVE

Ronald V. Smith, Merchantville, N. J., assignor to J. E. Lonergan Company, Philadelphia, Pa., a corporation of Pennsylvania Application August 11, 1953, Serial No. 373,506

2 Claims. (Cl. 137—469)

The present invention relates to safety valves for liquids and more particularly to valves of the type which open automatically when the liquid pressure exceeds a predetermined value.

The major problem in conventional liquid relief valves is the drumming or hammering which occurs when the valve is displaced from its seat. This is especially so in high capacity liquid relief valves i. e., in valves which are designed to handle a rapid flow of the liquid. Valves of this character are used in bypass lines for heavy-duty fuel oil pumps and like installations, and when the pressure is such as to require full-capacity bypass, the valve element drums or hammers on the valve seat. This drumming or hammering in some installations is so pronounced that the valve may become dislodged from its fittings, and in any event, causes excessive wear of the valve element and the valve seat. In a valve which drums or hammers consistently, the elements must be frequently replaced and repaired in order that the valves function properly to provide the necessary pressure relief.

Prior to the present invention, attempts have been made to minimize drumming in valves by the addition of mechanism to retard or damp movement of the valve when it is displaced from its seat. Although these mechanisms operate reasonably satisfactorily when there is reduced flow through the valve, they substantially reduce the capacity of the valve so that it is necessary to use a much larger valve than otherwise would be required for a particular installation. These mechanisms do not eliminate drumming—merely lessen its effect, and in addition, add substantially to the initial cost and maintenance of the valve.

With the foregoing in mind, therefore, a primary object of the present invention is to provide a novel pressure relief valve for liquids in which drumming is eliminated without sacrifice of the normal capacity of the valve.

Another object of the present invention is to provide a non-drumming liquid relief valve in which no special mechanism is necessary to damp or control the movement of the valve element when it is displaced from its seat.

More specifically, the invention contemplates a novel valve structure for liquid pressure relief valves of extremely simplified mechanical design which is fully effective and efficient in operation and use.

These and other objects of the invention and the various features and details of the construction and operation thereof are more fully set forth hereinafter with reference to the accompanying drawing in which the single figure is a vertical transverse sectional view of a liquid pressure relief valve made in accordance with the present invention.

Referring now to the drawing, the invention is shown in conjunction with a conventional type relief valve which comprises the usual valve body 1 having a main chamber 2 in liquid communication with an outlet port 3. Liquid is introduced into the chamber 2 through an inlet port 4 terminating in a nozzle 5 having a restricted throat portion indicated at 6. The nozzle 5 terminates at its inner extremity in a valve seat 7 which is normally closed by a valve member 8 slidably mounted for vertical movement in a guide structure 9 fixed in the body 1.

The valve member is biased into engagement with the valve seat by means of a piston stem 11 which projects upwardly through the casing to a manual release lever indicated generally at 12. A spring 13 seats at its upper end against an adjusting screw 14 and at its other end, against a washer 15 carried by a shoulder 16 on the stem 11. Thus, the spring 13 urges the valve member 8 into seating engagement with the valve seat 7. The spring bias may be regulated by adjusting the screw 14.

I have discovered that drumming and hammering in liquid pressure relief valves can be eliminated by providing a liquid flow area at the valve seat 7 that is several times greater than the flow area through the restricted throat 6 of the nozzle 5. More particularly, I have determined that the ratio of the flow area through the valve seat 7 to the flow area through the throat 6, is relatively critical and must be not less than about 3.5 to 1. In order to provide a valve seat flow area of this size, the diameter of the valve seat 7 is substantially greater than the diameter of the restricted throat 6 in the nozzle 5. In the valve construction shown in the drawing, this is accomplished by flaring the wall of the nozzle 5 sharply inwardly of the valve from the restricted throat 6 to the valve seat 7, as indicated at 17. By reason of my discovery, it is now possible to provide a liquid relief valve in which drumming is eliminated without sacrificing the normal capacity of the valve. It is also possible to provide a valve which does not drum and which is free from additional mechanism associated with the valve element to damp or control the movement of the valve element when it is displaced from its seat. It is also possible now to provide a liquid relief valve of extremely simplified construction and which is fully effective and efficient in operation and use.

While a particular embodiment of the invention has been herein illustrated and described, it is not intended to limit the invention to such disclosure, and changes and modifications may be made therein and thereto within the scope of the following claims.

I claim:

1. A pressure relief valve for liquids comprising a valve casing having an exhaust port in fluid communication therewith, an inlet nozzle in said casing having a continuous internal surface defining a throat of reduced flow area and terminating at its inner end in a valve seat having a predetermined flow area therethrough, the ratio of the flow area through the valve seat to the flow area through the throat being at least 3.5 to 1, a movable valve element engageable with said valve seat, and means normally biasing said valve element into engagement with said valve seat.

2. A pressure relief valve for liquids comprising a valve casing having an exhaust port in fluid communication therewith, an inlet nozzle in said casing having a restricted throat intermediate its ends and terminating at its inner end in a valve seat, the wall of said nozzle inwardly of the restricted throat flaring sharply from the throat to the valve seat and providing a flow area through the valve seat at least 3.5 times the flow area through said restricted throat, a movable valve element engageable with said valve seat, said element having a depending skirt surrounding said seat when engaged therewith, and means normally biasing said valve element into engagement with said valve seat.

References Cited in the file of this patent

UNITED STATES PATENTS

| | | |
|---|---|---|
| 2,476,285 | Corcoran | July 19, 1949 |
| 2,504,470 | Trautman | Apr. 18, 1950 |
| 2,517,858 | Farris | Aug. 8, 1950 |
| 2,628,632 | Dayton | Feb. 17, 1953 |